US007040343B2

(12) United States Patent
Tseng

(10) Patent No.: US 7,040,343 B2
(45) Date of Patent: May 9, 2006

(54) VALVE ASSEMBLY WITH LOW GAS LEVEL SIGNALING AND CONTROLLING FUNCTION

(75) Inventor: Kuo-Cheng Tseng, Taichung (TW)

(73) Assignee: Grand Gas Equipment Incorporated, Taichung (TW)

( * ) Notice: Subject to any disclaimer, the term of this patent is extended or adjusted under 35 U.S.C. 154(b) by 9 days.

(21) Appl. No.: 10/289,270

(22) Filed: Nov. 7, 2002

(65) Prior Publication Data

US 2004/0089351 A1    May 13, 2004

(51) Int. Cl.
    *F16K 31/18*     (2006.01)
(52) U.S. Cl. .................. 137/390; 137/423; 137/430; 137/446; 141/198
(58) Field of Classification Search ............... 137/386, 137/389, 390, 423, 429, 430, 446; 73/306, 73/311; 141/198
See application file for complete search history.

(56) References Cited

U.S. PATENT DOCUMENTS

| | | | | |
|---|---|---|---|---|
| 1,357,986 A | * | 11/1920 | Jerdone, Jr. ............... | 137/390 |
| 1,357,988 A | * | 11/1920 | Jerdone, Jr. ............... | 137/390 |
| 1,427,965 A | * | 9/1922 | Matuschak et al. ......... | 137/390 |
| 4,335,734 A | * | 6/1982 | Trinkwalder ............... | 137/390 |
| 4,360,038 A | * | 11/1982 | Trinkwalder, Jr. .......... | 137/390 |
| 6,138,709 A | * | 10/2000 | Home ....................... | 137/446 |
| 6,178,994 B1 | * | 1/2001 | Park ......................... | 137/446 |

* cited by examiner

*Primary Examiner*—Kevin Lee
(74) *Attorney, Agent, or Firm*—Leong C. Lei

(57) ABSTRACT

A valve assembly with low gas level signaling and controlling function includes a primary valve threadedly engaged with an outlet of a tank, the primary valve being formed with a recess in which is fitted a plunger having an upper end extending upwardly through the primary valve to engage with a knob, a low level linking device comprising a tubular tube connected with a bottom of the primary valve, a flexible rod having an end extending upwardly through the tubular tube to connect with the primary valve and another end connected with an end of a float rod, and a float connected with another end of the float rod, and a release rod connected a pusher which is operatively connected with the primary valve so that when the release rod is turned, the pusher will move down the flexible rod to open the primary valve, whereby the valve assembly can detect the amount of gas remaining in a gas tank and will close when the level has decreased to a certain level thereby alerting the users and enabling them to replenish their gas supplies before all gas has been exhausted in the present gas tank, and in the meantime the user may use a release valve to release the closed valve and use the remaining gas.

3 Claims, 14 Drawing Sheets

VALVE ASSEMBLY WITH LOW GAS LEVEL SIGNALING AND CONTROLLING FUNCTION

BACKGROUND OF THE INVENTION

1. Field of the Invention

This invention is related to a valve assembly, and in particular to one which can detect the amount of gas remaining in a gas tank. The valve will close when the level has decreased to a certain level, thereby alerting the users and enabling them to replenish their gas supplies before all gas has been exhausted in the present gas tank. In the meantime, the user may use a release valve to release the closed valve, and use the remaining gas.

2. Description of the Prior Art

Combustible liquified gas is convenient for us to carry out combustion operation, and especially as liquefied gas burns completely. The burning is very clean, and unlike coal, no black smoke will be produced. Hence, liquefied gas is widely used for heating, and cooking. Further, liquefied gas is also used for welding and manufacturing. However, no matter what kind of liquefied gas is used, they must all be filled in a gas tank in order to facilitate their transportation. When in use, the outlet of the gas tank is connected to the burner, so that when the gas tank is turned open, the liquefied gas tank will flow to the burner for burning.

Generally, the conventional gas tank is provided with a simple valve. When the liquefied gas is decreased to a level such that it is insufficient for cooking a meal, the user cannot perceive this, so that it often happens that cooking will be interrupted as a result. Thus, the user has to purchase a new gas tank in order to continue cooking, which is inconvenient, particularly for people located far from gas stations or the like. However, it is also dangerous to have multiple gas tanks in the home.

Therefore, it is an object of the present invention to provide a gas valve with low gas level signaling and controlling function which can obviate and mitigate the above-mentioned drawbacks.

SUMMARY OF THE INVENTION

This invention is related to a valve assembly which can detect the amount of gas remaining in a gas tank.

It is the primary object of the present invention to provide a valve assembly which will close when the level has decreased to a certain level, thereby alerting the users and enabling them to replenish their gas supplies before all gas has been exhausted in the present gas tank.

It is another object of the present invention to provide a valve assembly with low gas level signaling and controlling function which enables the user to use a release valve to release the closed valve to use the remaining gas.

It is a further object of the present invention to provide a valve assembly with low gas level signaling and controlling function which includes a primary valve threadedly engaged with an outlet of a tank, the primary valve being formed with a recess in which is fitted a plunger having an upper end extending upwardly through the primary valve to engage with a knob, a low level linking device comprising a tubular tube connected with a bottom of the primary valve, a flexible rod having an end extending upwardly through the tubular tube to connect with the primary valve and another end connected with an end of a float rod, and a float connected with another end of the float rod, and a release rod connected a pusher which is operatively connected with the primary valve so that when the release rod is turned, the pusher will move down the flexible rod to open the primary valve, whereby the valve assembly can detect the amount of gas remaining in a gas tank and will close when the level has decreased to a certain level thereby alerting the users and enabling them to replenish their gas supplies before all gas has been exhausted in the present gas tank and in the meantime the user may use a release valve to release the closed valve and use the remaining gas.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
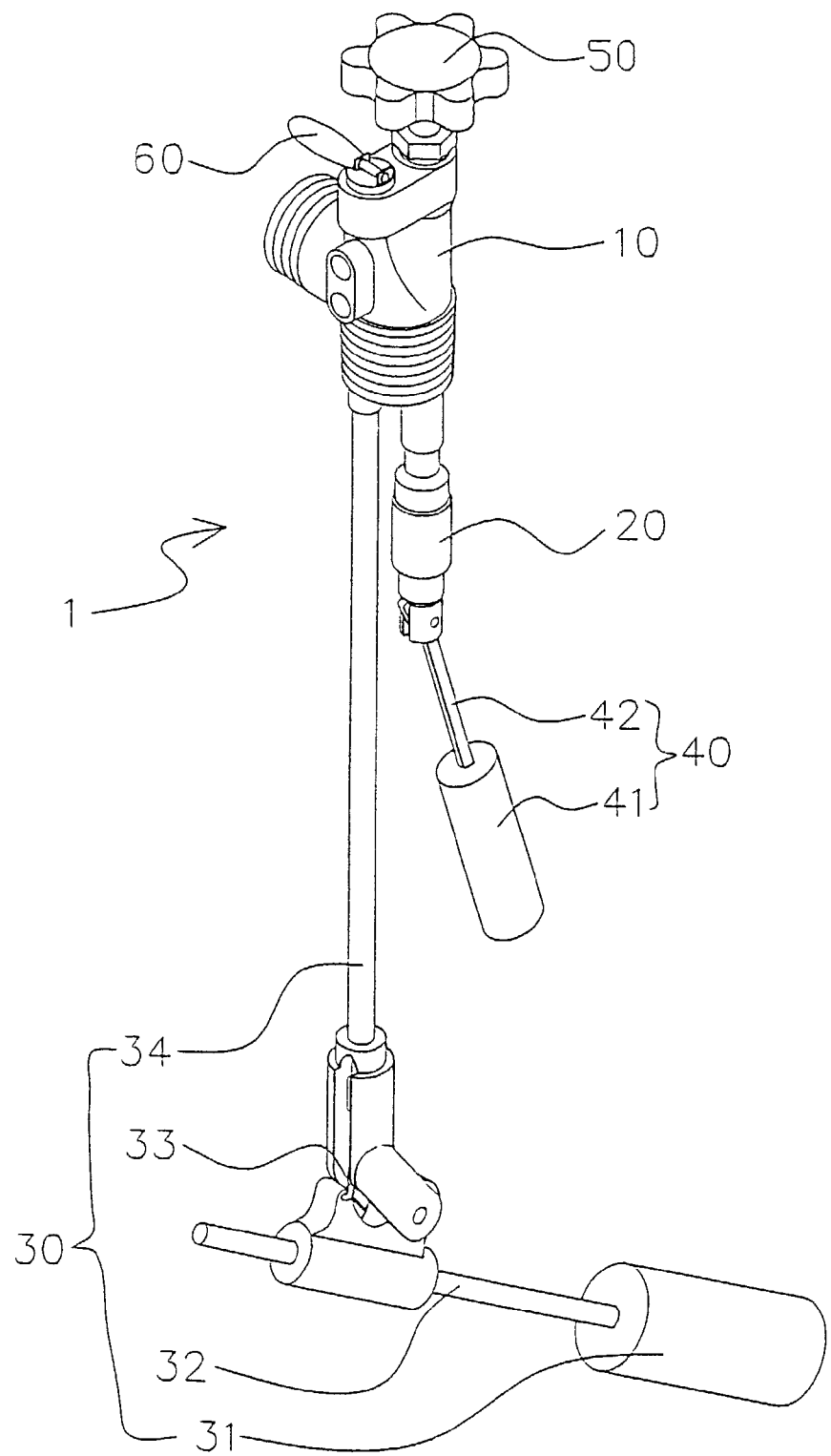
FIG. 1 is a perspective view of the present invention.
Figure 2:
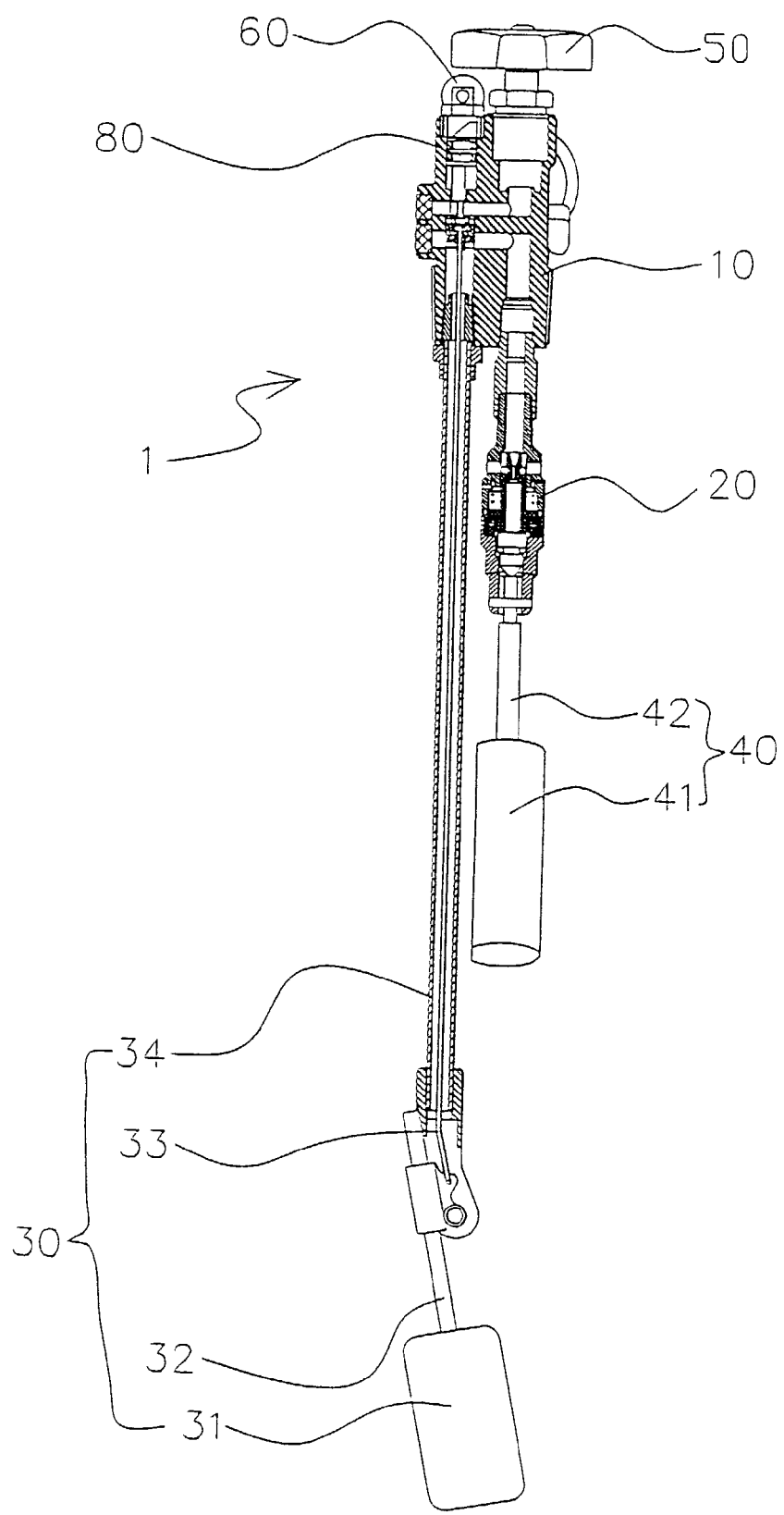
FIG. 2 is a sectional view of the present invention.
Figure 3:
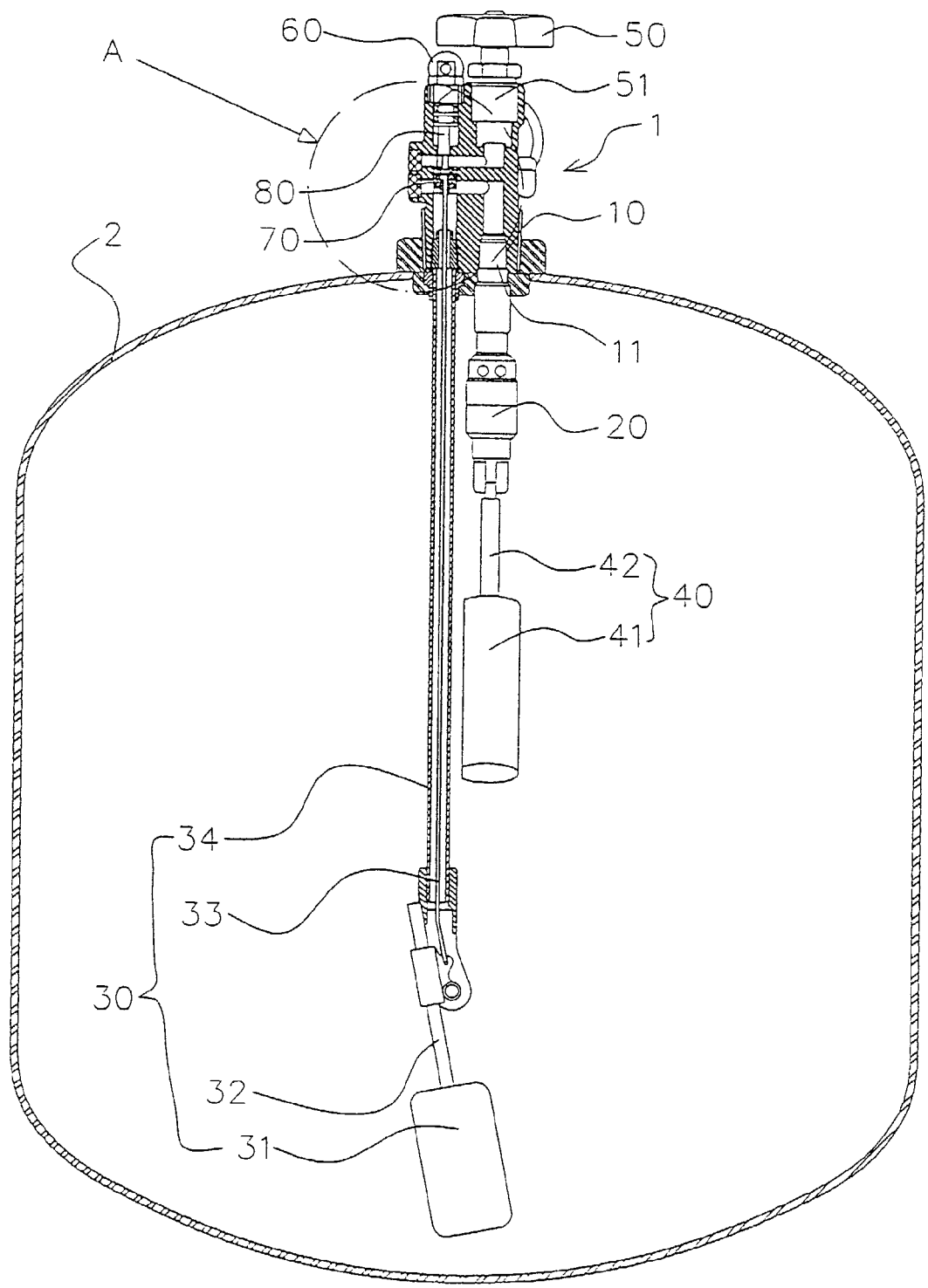
FIG. 3 is a sectional view of a gas tank mounted with the present invention.

With reference to the drawings and in particular to FIGS. 1, 2 and 3 thereof, the valve assembly 1 according to the present invention is adapted for engaging with a tank 2. As shown, the valve assembly 1 generally comprises a primary valve 10, an overfill protection device 20, a low level linking device 30, a knob 50, and a release rod 60. The structure of the overfill protection device 20 is disclosed in U.S. Pat. No. 6,138,709 to William Home, issued on Oct. 31, 2000, which is incorporated herein as a reference. The primary valve 10 is threadedly locked onto an outlet of the tank 2 and connected at the bottom with the overfill protection device 20 which is provided with a high level linking device 40. The bottom of the primary valve 10 is further connected with the low level linking device 30. The high level linking device 40 includes a float rod 42 and a float 41 fixedly connected with the lower end of the float rod 42. The other end of the float rod 42 is pivotally connected with the body portion of the overfill protection device 20. The low level linking device 30 comprises a tubular tube 34 connected with the bottom of the primary valve 10, a flexible rod 33 having an end extending through the tubular tube 34 to connect with the primary valve 10 and the other end connected with a float rod 32, and a float 31 fixedly mounted on the lower end of the float rod 32. The distance between the turning point of the flexible rod 33 and the float 31 is longer than the distance between the pivot axis of the tubular member 34 and the float 31, so that when the float 31 is moved upwards, the flexible rod 33 will be moved downward.

Figure 4:
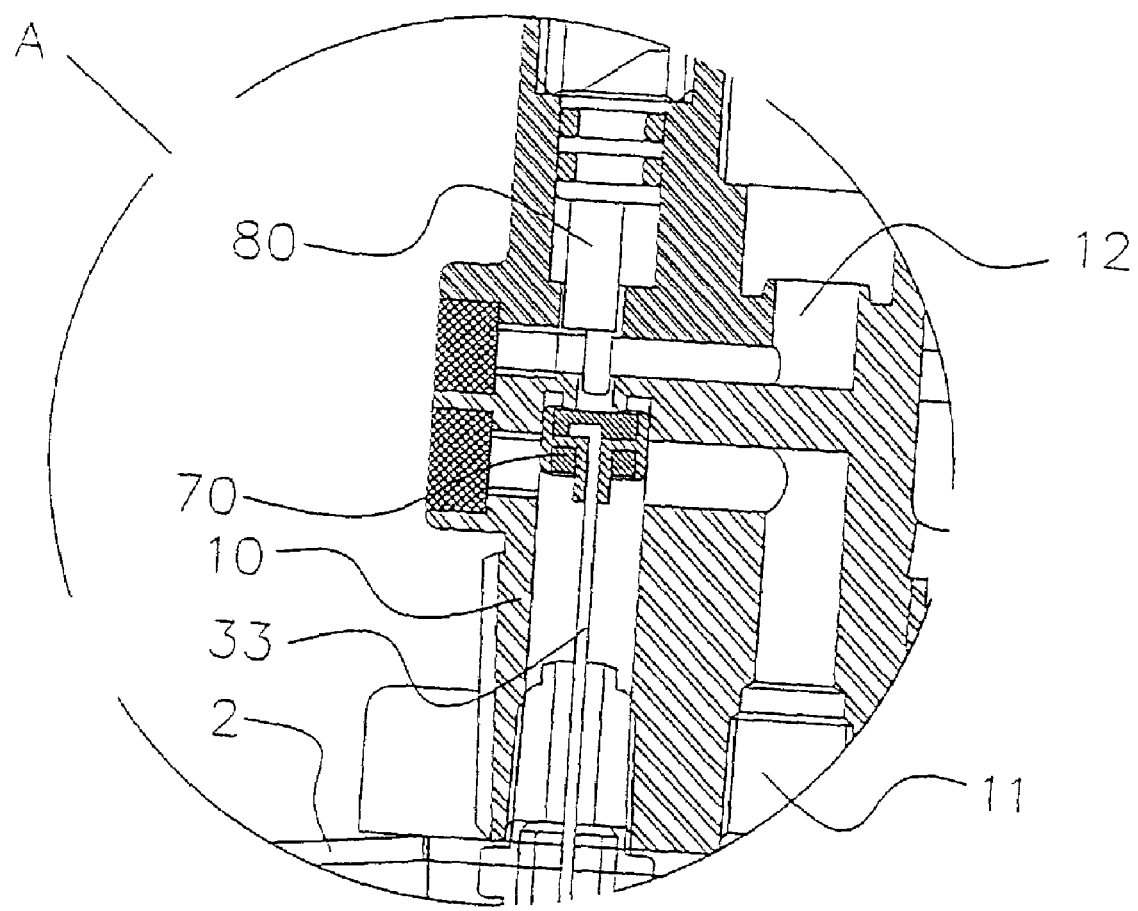
FIG. 4 is an enlarged view of a portion of FIG. 3.

The primary valve 10 is formed with a recess in which is fitted a plunger 51 which has an upper end extending upwardly through the primary valve 10 to engage with the knob 50 (see FIG. 3). The upper end of the flexible rod 33 extends upwardly into the prima valve 10 to engage with a piston 70 (see FIG. 4). A pusher 80 is connected with the release rod 60 and has a lower end against the top of the piston 70.

Figure 5:
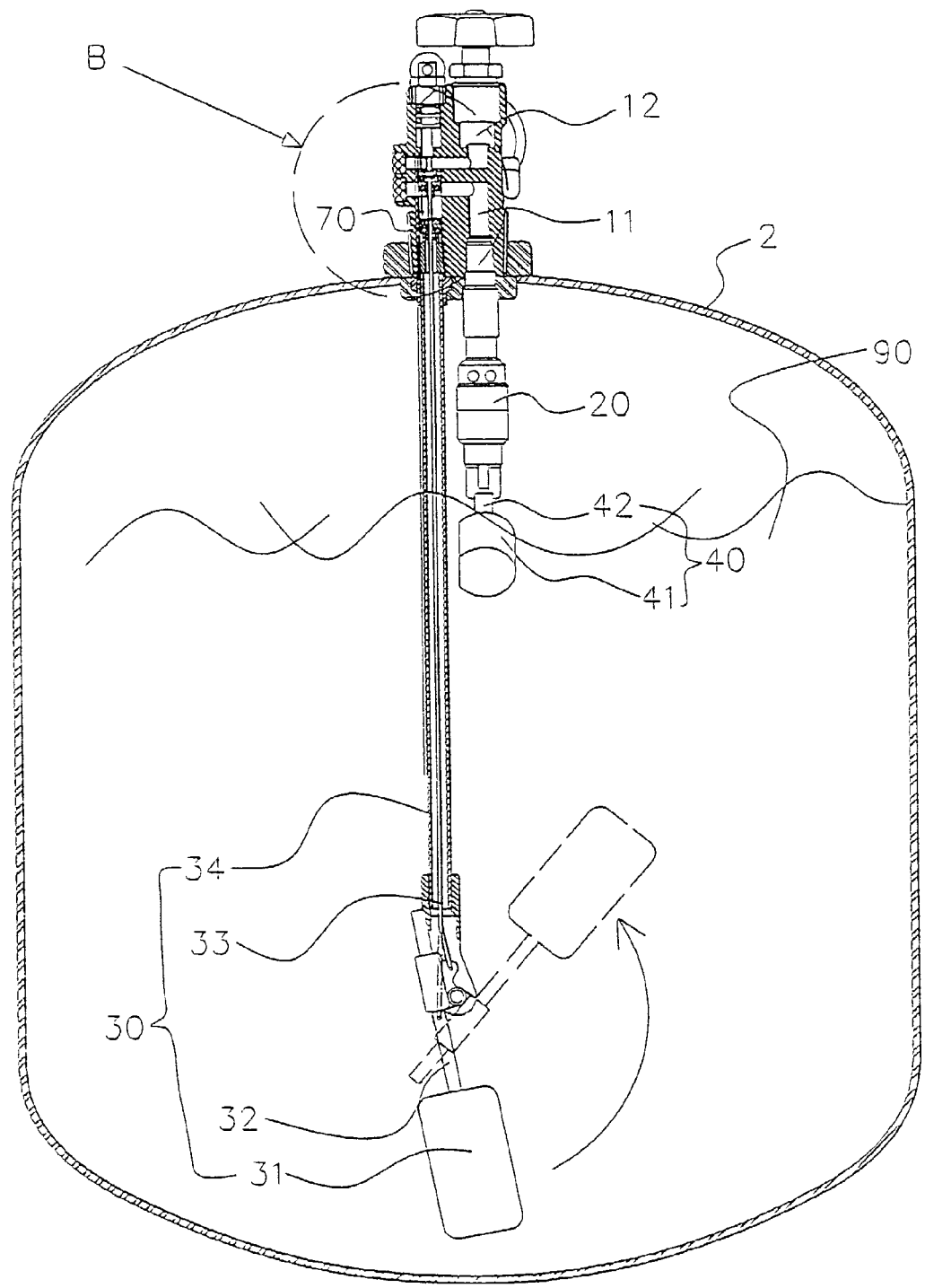
FIG. 5 is a working view of the present invention.
Figure 6:
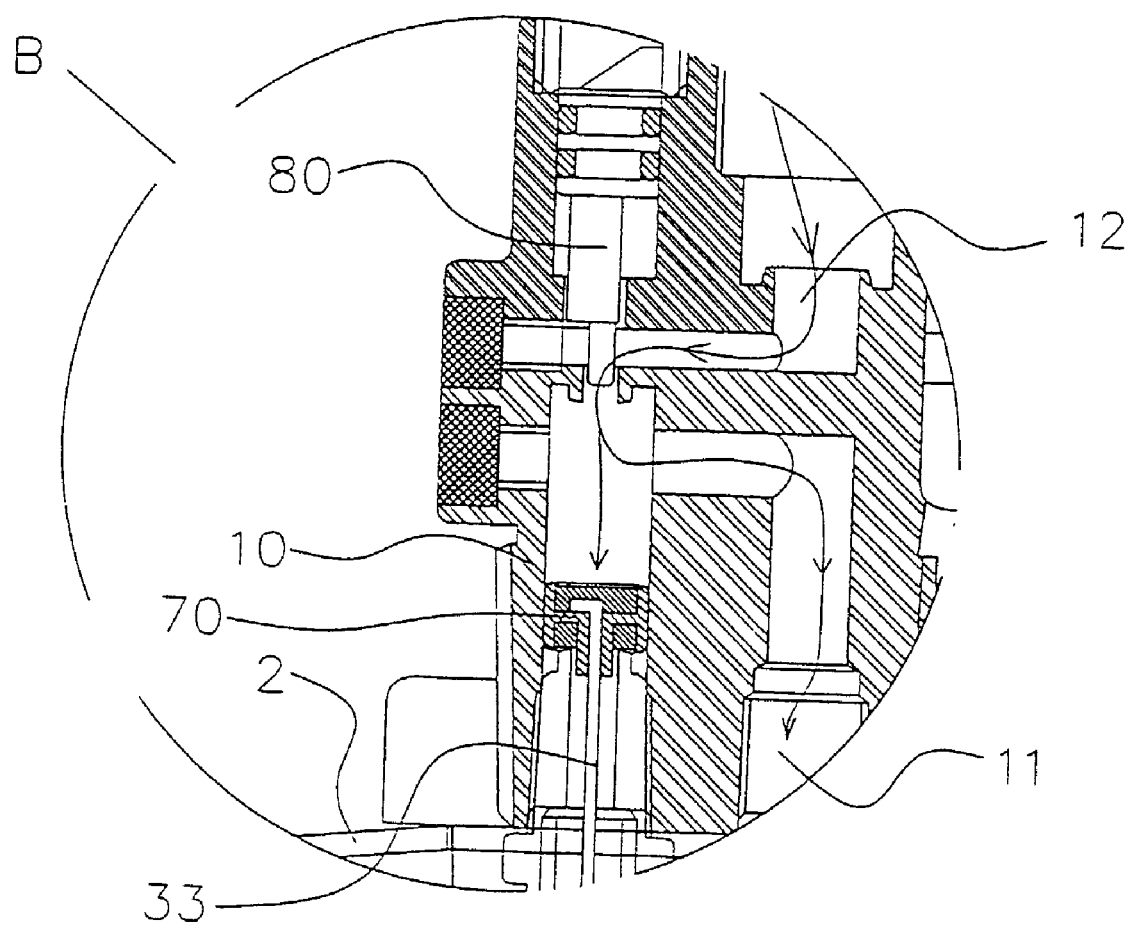
FIG. 6 is an enlarged view of a portion of FIG. 5.
Figure 7:
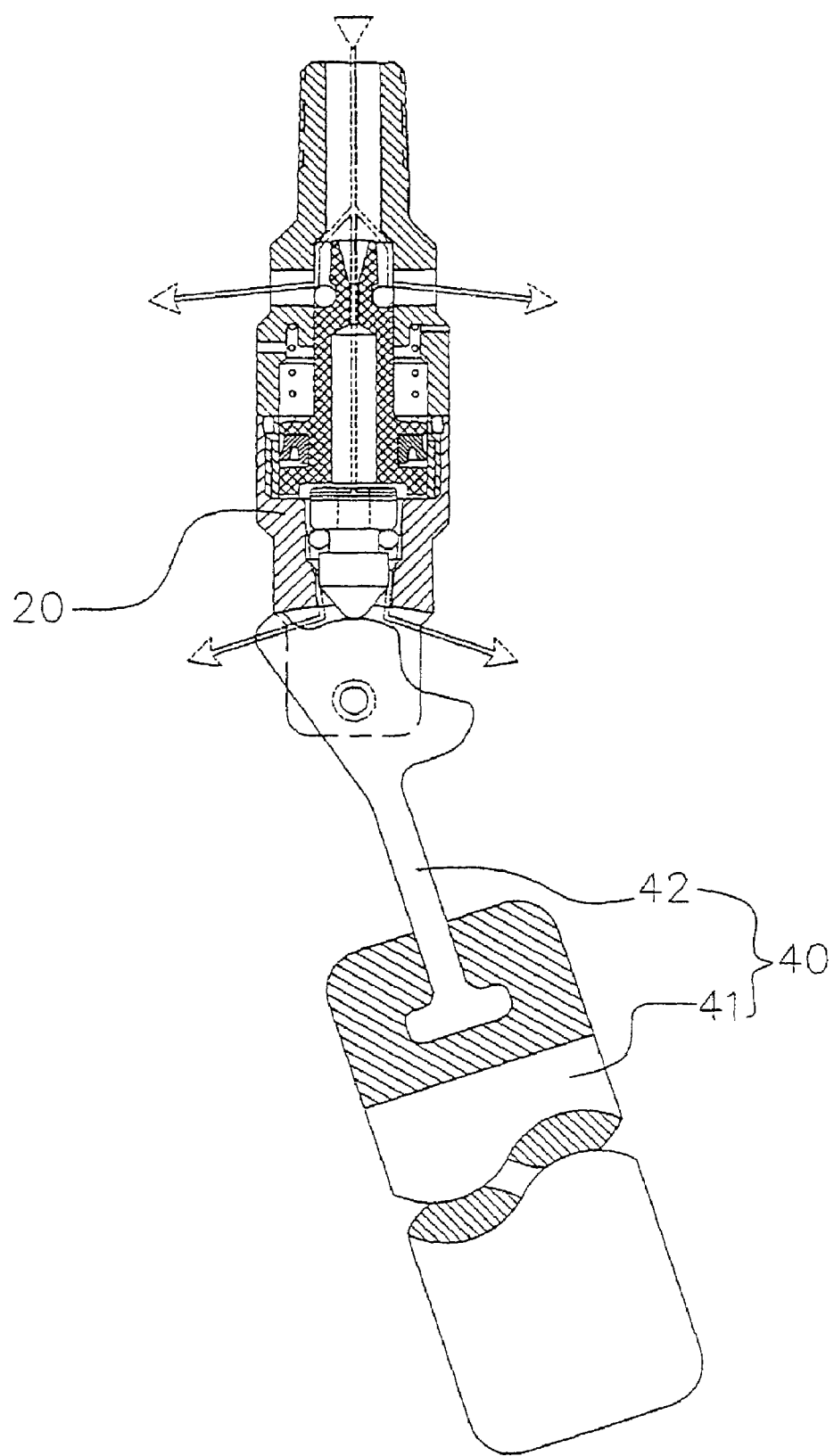
FIG. 7 is a sectional view of the overfill protection device.
Figure 8:
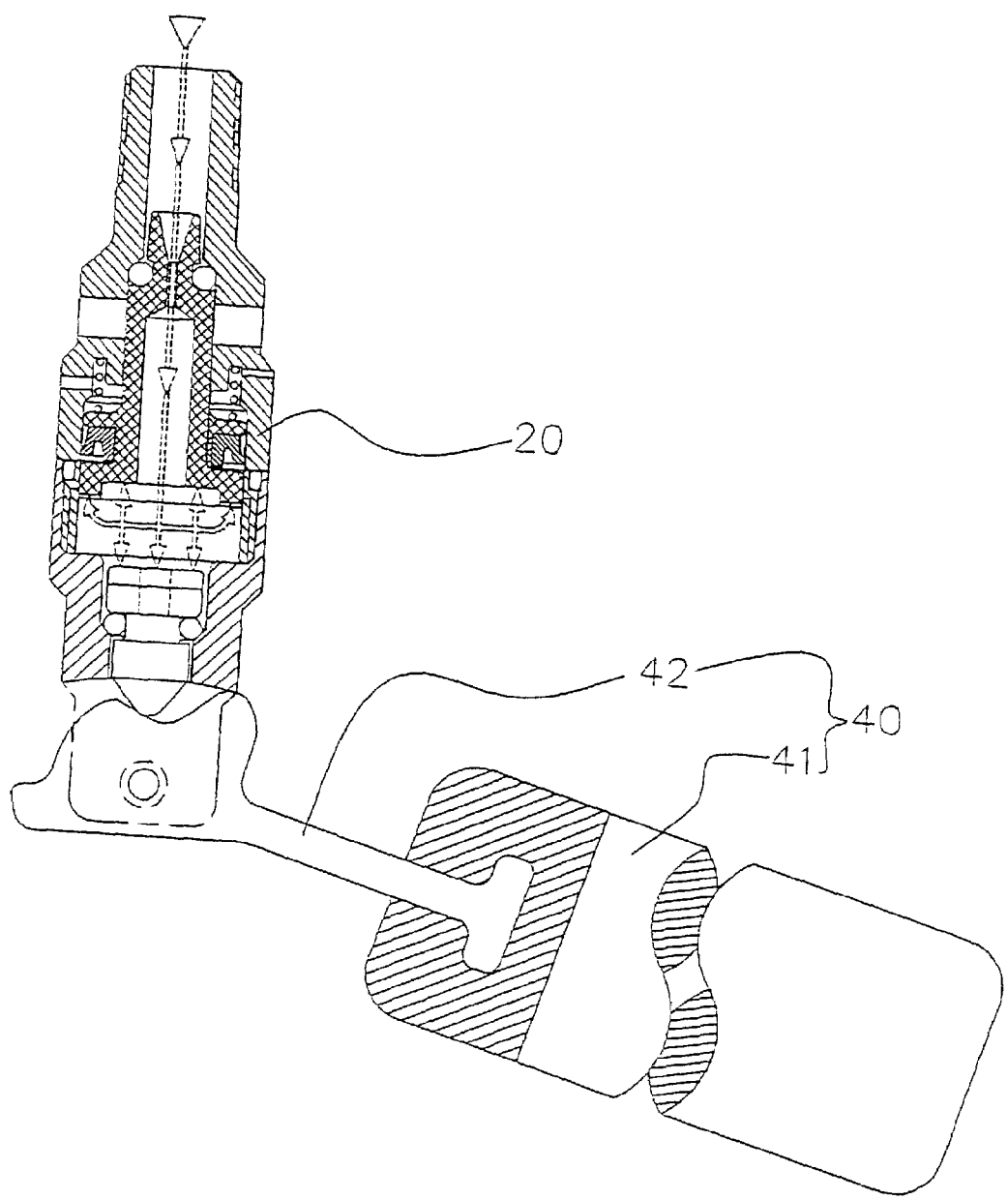
FIGS. 8 and 9 are sectional views illustrating the working principle of the overfill protection device.
Figure 9:
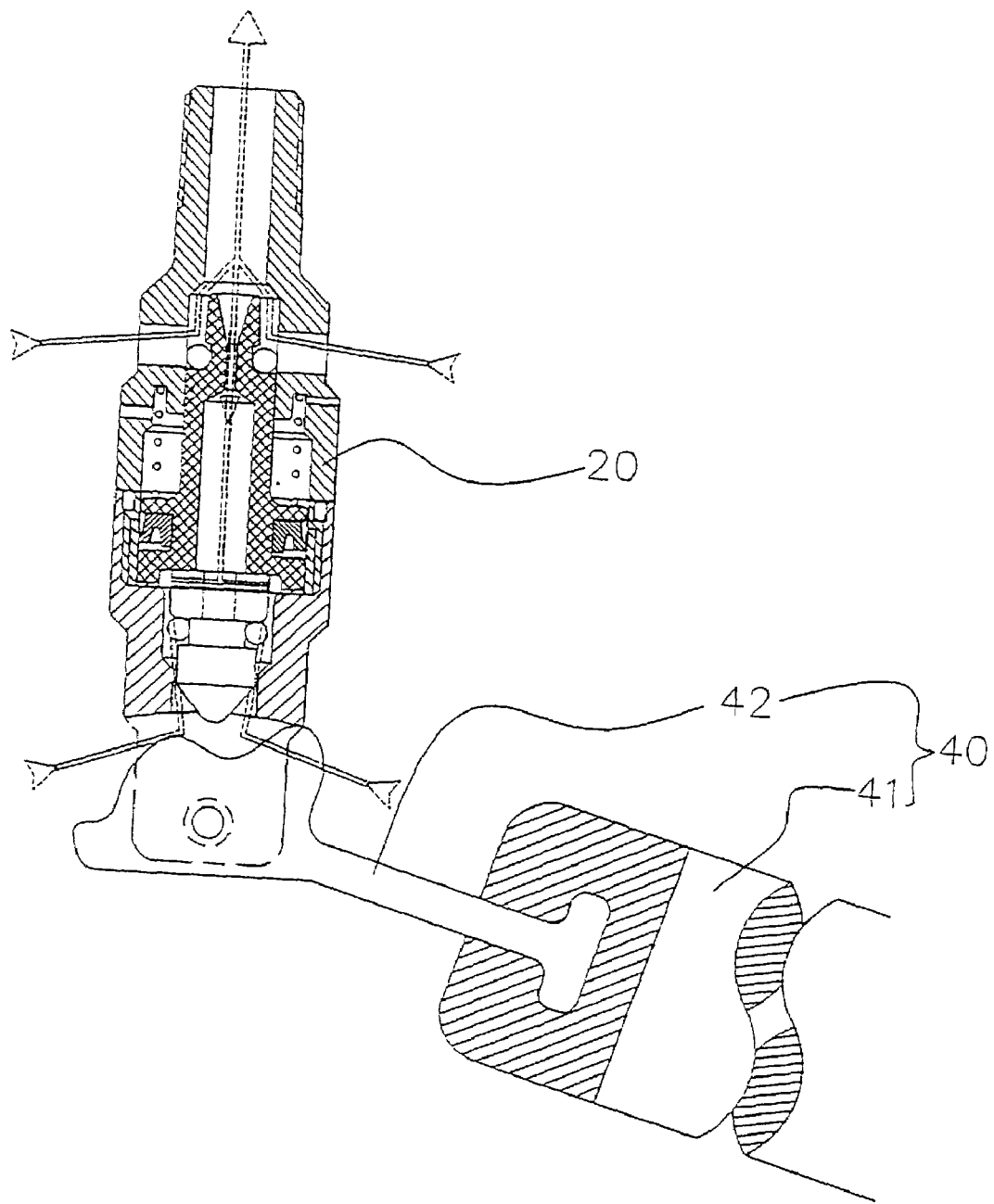

When no gas is filled into the tank 2, the floats 31 and 41 will move downwards due to gravitational force thereby pushing the flexible rod 33 to go upwardly and therefore closing the passage 11 from the primary valve 10 to the overfill protection device 20. As a consequence, impurities may be prevented from dropping to contaminate the inside of the tank 2 (see FIG. 4). As shown in FIGS. 5 and 6, when pressurized gas is being filled into the tank 2, gas will go through the passage 11 and then push down the piston 70 to flow into the overfill protection device 20 thereby opening the overfill protection device 20 and therefore enabling gas to flow through the overfill protection device 20 into the tank 2 (see FIG. 7). Meanwhile the float 41 will be lifted to move the float rod 42 to the position as shown in FIG. 8 thereby closing the overfill protection device 20. Hence, no more gas is allowed to flow through the overfill protection device 20 into the tank according to the present invention when the pressure within the tank 2 exceeds the predetermined level. Then, as shown in FIG. 9, the gas may flow out of the overfill protection device 20 to a burner or the like (not shown).

Figure 10:
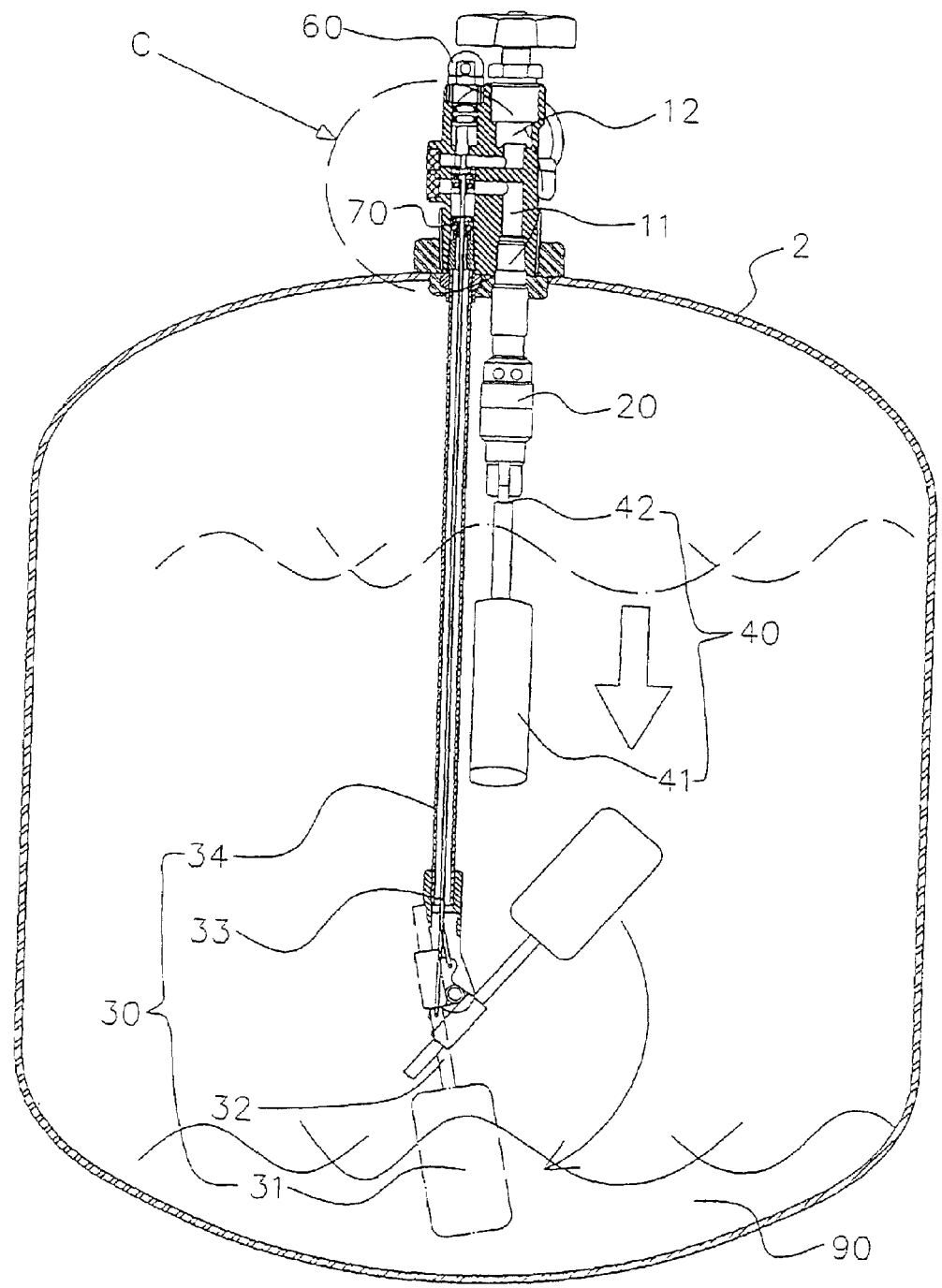
FIG. 10 is a sectional view illustrating the working principle of the present invention.
Figure 11:
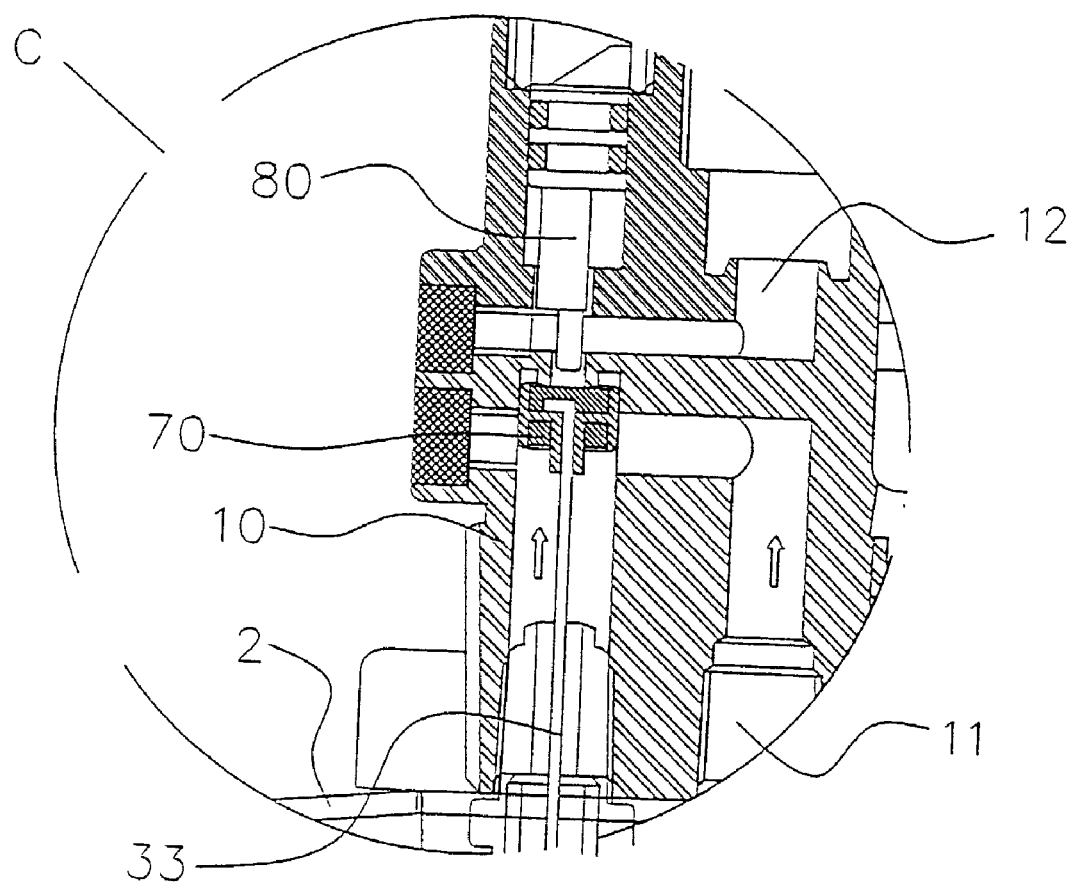
FIG. 11 is an enlarged view of a portion of FIG. 10.
Figure 12:
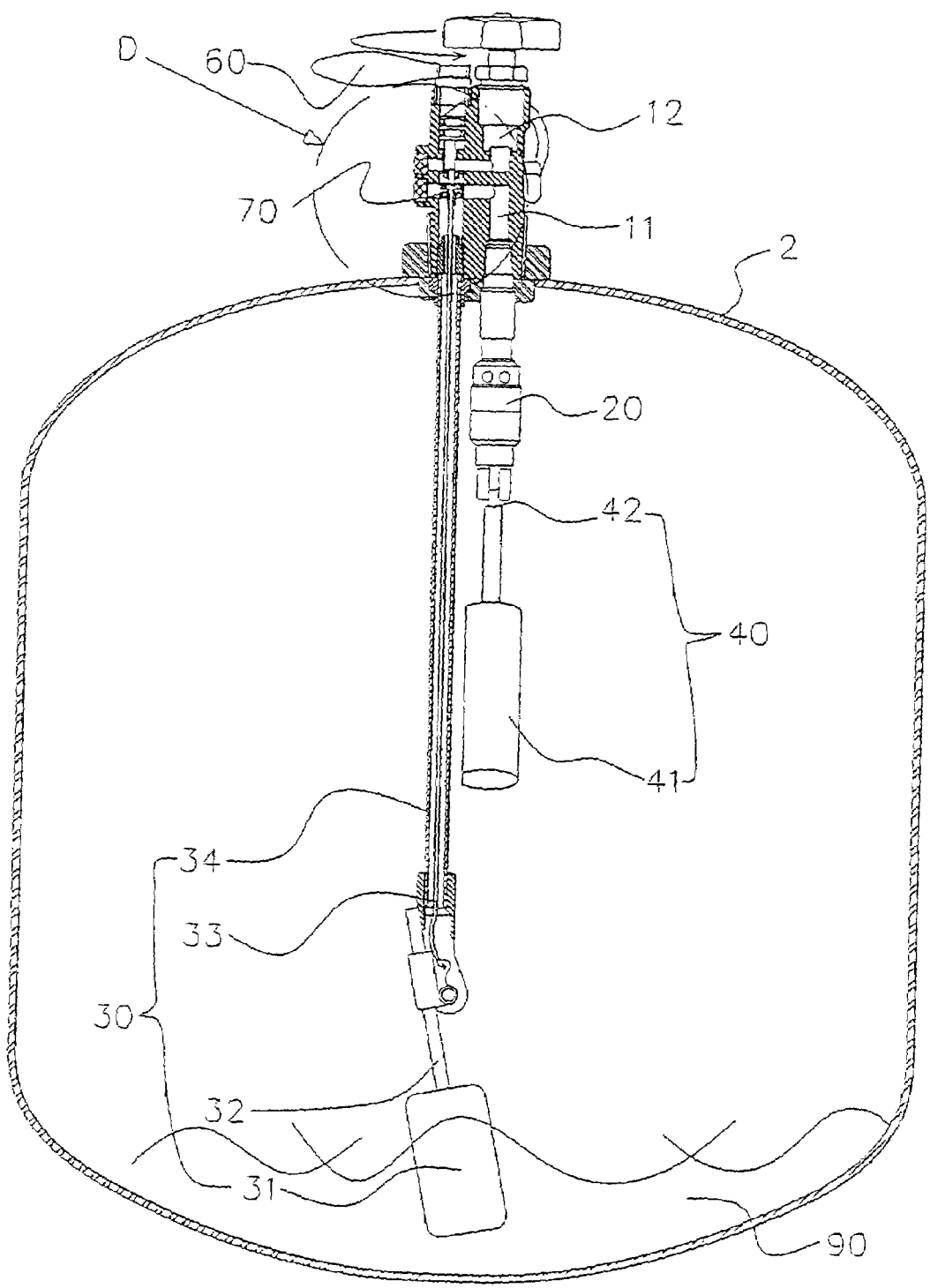
FIG. 12 is a sectional view illustrating how to use the remaining gas in the gas tank.
Figure 13:
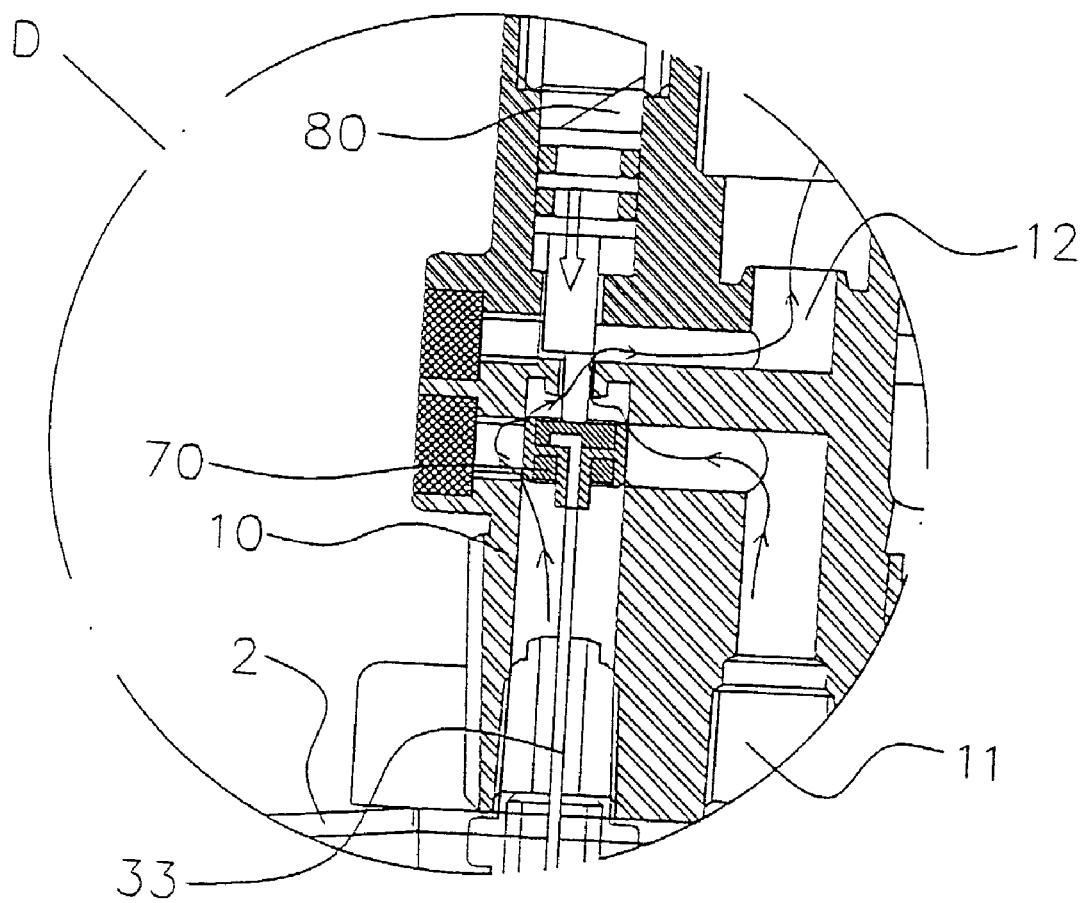
FIG. 13 is an enlarged view of a portion of FIG. 12.

As shown in FIGS. 10 and 11, when the gas inside the tank 2 decreases to a level where the float 31 is moved to its lowest position, the float rod 32 pushes the flexible rod 33 to move upwardly to close the piston 70 thereby interrupting the communication between the passages 11 and 12 thereby alerting the users and enabling them to replenish their gas supplies before all gas has been exhausted in the present gas tank.

When desired to use the remaining gas, it is only necessary to move down the release rod 60 so that the pushrod 80 goes downwardly thereby pushing the piston 70 downwardly to open the primary valve 10. As a result, the remaining gas can flow out of the valve assembly for use.

Figure 14:
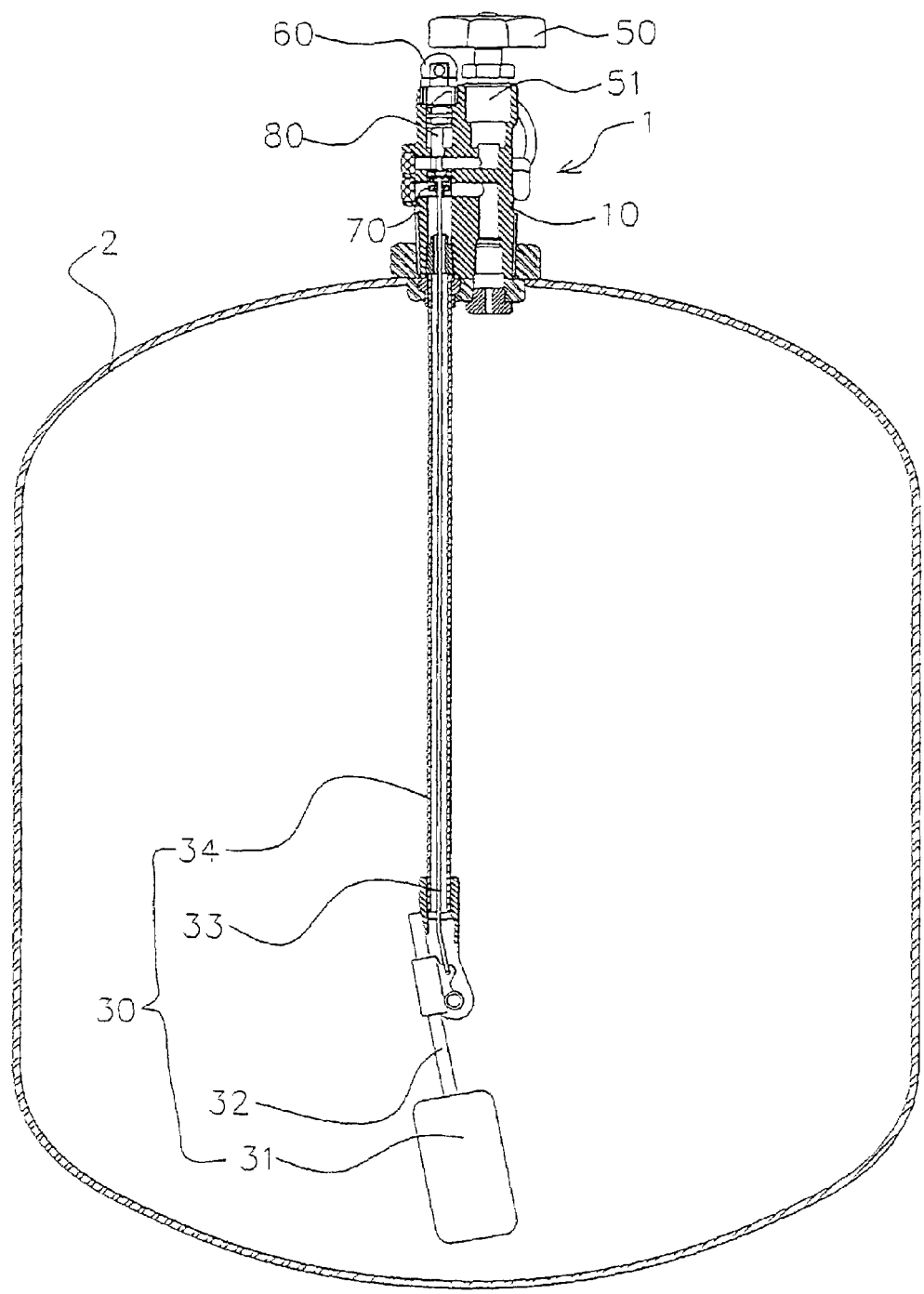
FIG. 14 is a sectional view of the present invention without the overfill protection device.

FIG. 14 is a sectional view of the present invention without the overfill protection device 20. As illustrated, the valve assembly can still detect the amount of gas remaining in a gas tank and will close when the level has decreased to a certain level without the installation of the overfill protection device 20.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A valve assembly with low gas level signaling and controlling function comprising:

a primary valve engaged wit an outlet of a tank, said primary valve being formed with a recess in which is fitted a plunger having an upper end extending upwardly through said primary valve to engage with a knob;

a low level linking device comprising a tube connected with a bottom of said primary valve, a flexible rod having an end extending upwardly through said tube into said primary valve to engage with a piston and another end connected with an end of a float rod, said float rod being pivotally connected with a lower end of said flexible rod, a lower end of said float rod being connected with a float; and a release rod connected with a pusher which is mounted in said primary valve so that when said release rod is turned, said pusher will be moved by said release rod to go downwardly to push said rod to open said primary valve, said pusher having a lower end against a top of said piston;

whereby when gas inside said tank decreases to a level where said float is moved to a lowest position, said float rod will push said flexible rod to move upwardly to lift said piston thereby blocking a passage from said outlet of said tank to an interior of said tank.

2. The valve assembly with low gas level signaling and controlling function as claimed in claim 1, wherein distance between a pivot axis of said rod and said float is longer than distance between a pivot axis of said tube and said float, so that when said float is moved upwards, said flexible rod will be moved downward.

3. The valve assembly with low gas level signaling and controlling function as claimed in claim 1, further comprising an overfill protection device engaged wit said primary valve.

* * * * *